US006487608B2

(12) United States Patent
Gifford, Jr. et al.

(10) Patent No.: US 6,487,608 B2
(45) Date of Patent: *Nov. 26, 2002

(54) METHOD FOR AUTOMATICALLY CONFIGURING NETWORK INTERFACE CARD AND CAPABLE OF RANDOMIZING A MEDIA ACCESS CONTROLLER ADDRESS OF THE NETWORK INTERFACE CARD

(75) Inventors: Gordon W. Gifford, Jr., Arlington, TX (US); Randall K. Maxwell, Oregon City, OR (US)

(73) Assignee: Computer Associates Think, Inc., Islandia, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,108

(22) Filed: Aug. 2, 1999

(65) Prior Publication Data

US 2002/0108002 A1 Aug. 8, 2002

(51) Int. Cl.[7] ............................ G06F 3/00; G06F 13/00; G06F 15/177; G06F 9/00
(52) U.S. Cl. ............................ 710/8; 710/10; 710/102; 713/1
(58) Field of Search ........................ 710/8, 9, 10, 103, 710/104, 102; 709/220, 221, 321, 327; 713/1

(56) References Cited

U.S. PATENT DOCUMENTS

| | | | | |
|---|---|---|---|---|
| 5,161,102 A | * | 11/1992 | Griffin et al. | 710/104 |
| 5,634,075 A | * | 5/1997 | Smith et al. | 710/9 |
| 5,655,148 A | * | 8/1997 | Richman et al. | 710/8 |
| 5,751,967 A | * | 5/1998 | Raab et al. | 709/228 |
| 5,787,246 A | * | 7/1998 | Lichtman et al. | 709/220 |
| 5,852,722 A | * | 12/1998 | Hamilton | 709/221 |
| 6,003,097 A | * | 12/1999 | Richman et al. | 710/8 |
| 6,023,585 A | * | 2/2000 | Perlman et al. | 395/712 |
| 6,105,100 A | * | 8/2000 | Dean et al. | 710/220 |
| 6,269,481 B1 | * | 7/2001 | Perlman et al. | 717/11 |
| 6,311,242 B1 | * | 10/2001 | Falkenburg et al. | 710/103 |
| 6,324,608 B1 | * | 11/2001 | Papa et al. | 710/103 |

FOREIGN PATENT DOCUMENTS

JP 405040637 A * 2/1993 ........... G06F/9/445

OTHER PUBLICATIONS

Copy of Notification of Transmittal of International Preliminary Examination Report as received in corresponding PCT case (PCT/US00/40525).
Copy of Written Opinion as received in corresponding PCT case (PCT/US00/40525).
Copy of PCT International Search Report as received in corresponding PCT case (PCT/US00/40525).
Platinum Technology Fact Sheet: Intel LAND® Configuration Manager, www.platinum.com/products/factsht/1 cmfs.htm.
Intel.com home: Intel LAND® Configuration Manager 1.50.2, www.intel.com/network/doc/1890/index.htm.
Intel.com home: Intel LAND® Configuration Manager, Simplified configuration management for networked PCs, www.intel.com/network/doc/1474/index.htm.

* cited by examiner

Primary Examiner—Thomas Lee
Assistant Examiner—Chun Cao
(74) Attorney, Agent, or Firm—Cooper & Dunham LLP

(57) ABSTRACT

A method, system and computer readable medium for performing automatic detection and identification of installed NICs with a minimized likelihood of performing an illegal operation that would hang the detection process. Once the NIC is identified, software appropriate for the NIC may be loaded. Automatic detection and identification of NICs may be performed by inserting a portable medium such as a floppy disk in a target computer and executing a detection program upon startup, or a server computer may be used which executes a program to detect and identify NICs installed in computers connected to the server via a network connection.

11 Claims, 4 Drawing Sheets

METHOD FOR AUTOMATICALLY CONFIGURING NETWORK INTERFACE CARD AND CAPABLE OF RANDOMIZING A MEDIA ACCESS CONTROLLER ADDRESS OF THE NETWORK INTERFACE CARD

FIELD OF THE INVENTION

The present invention broadly relates to distributed computing environments. Specifically, the present invention relates to the configuration of computer components in a computer network. More specifically, the present invention relates to automatic detection and identification of network interface cards.

BACKGROUND OF THE INVENTION

Computer networks often incorporate equipment containing different components. Components may differ because of the specific function of the individual computer, vendor source or age of the component, or the time at which the component was updated. As a result, the network interface card (NIC) used to connect the computer to the network often differs from machine to machine. One of the tasks of a network administrator is to update various software used on the network, including operating system software and specific application software. Often, in order to update the software on an individual computer, the network administrator must modify system and protocol files stored in the computer to specify the network driver interface specification ("NDIS") driver and characteristics of the NIC. These characteristics often include resource allocation of the PC such as input/output ("I/O") addresses, memory mapping, direct memory access ("DMA") channels, and interrupt assignments. In modem PC designs, these resources are dynamically allocated by the basic input output system ("BIOS") of the PC in such a fashion as to eliminate conflicts. Hard encoding this information in the system and protocol initialization files is incompatible with these dynamic allocation standards. In the case of deploying an updated operating system across an entire computer network, the configuration time is costly because the common practice is to use different magnetic floppy disks ("boot floppies") to support the various configurations throughout the network, and deployment is a largely manual process.

Embedded in the firmware of most NIC's is a unique media access controller ("MAC") address that complies with an established IEEE standard. This MAC address could be used to identify the NIC during the configuration process. However, access to this information early in the boot process can be problematic. Low level program access to this information normally requires detailed knowledge of the hardware design of the NIC. This information is not readily available in the PC industry and access often requires licensing provisions.

Another problem occurs with the NDIS driver version verification. The NDIS driver provided in the suite of drivers for a particular NIC are proprietary to the NIC provider. These drivers often go through numerous updates and these updates are distributed via such diverse channels as the Internet. An older or newer version of this driver may not provide the compatibility required and thus verification through testing is needed for proper configuration.

One of the problems facing the detection of a wide variety of NMC's is the likelihood of performing an illegal operation that will hang the process. There have been significant efforts by various industry committees to eliminate conflicts by creating standardized access methods for identifying an installed NIC. However, in some cases there still is no alternative to using direct hardware access methods to detect installed peripheral components. Unfortunately, there are numerous risks and pitfalls associated with the use of direct hardware access methods. Direct hardware access methods involve accesses to memory and I/O space in undefined regions to detect the presence of hardware registers or memory structures on a NIC that specific to that device. However, if some other device resides in these spaces, the response of that device may be indeterminate. Indeterminate responses often result in conditions which disrupt the boot process, such as an unexpected interrupt or hanging the bus signal.

U.S. Pat. No. 5,852,722, "System and Method for Automatic Configuration of Home Network Computers," discloses a system and method for determining local service provider information by looking up a directory of local service providers stored on a server. Client computer specific information is also obtained from a database and used by a server computer. The client computer then downloads the local service provider information and configuration information from the server computer to configure itself and establish connection to the local service provider. However, the '722 patent does not address the issue of network interface card detection.

Thus, there remains a need for a method and apparatus of rapidly configuring a network computer network that detects and identifies different NICs without performing illegal operations.

SUMMARY OF THE INVENTION

The present invention addresses the problems discussed above by providing a method and apparatus for performing device driver configuration and by performing automatic detection and identification of installed NICs with a minimized likelihood of performing an illegal operation that would hang the detection process. Once the NIC is identified, the present invention verifies and loads software appropriate for the NIC.

In one aspect, the present invention provides a method of automatically configuring a computer having at least one network interface card comprising the steps of: a) applying at least one standardized access method to identify at least one network interface card located on the computer; b) obtaining information in response to the application of the standardized access method; and c) loading software appropriate for the network interface card onto the computer in response to the first information.

In another aspect, the present invention provides a method of automatically configuring a computer having at least one network interface card comprising the steps of: a) applying at least one standardized access method to identify the network interface card; b) obtaining information in response to the application of the standardized access method; c) applying at least one direct hardware access method to said computer to identify at least one network interface card located on the computer; d) obtaining second information in response to the application of the direct hardware access method; and e) loading software appropriate for the network interface card onto the computer in response to the second information.

In another aspect, the present invention provides a computer system for configuring another computer having at least one network interface card, the computer system comprising: a) a first interface for receiving requests to configure the computer; b) a processor coupled to the first interface; c) a memory containing instructions to be executed by the processor; and d) a second interface for communicating network interface card information between the processor and the other computer.

In yet another aspect, the present invention provides a computer readable storage medium for use with computer apparatus, the medium including computer instructions which, when executed by the computer apparatus: a) apply at least one standardized access method to identify at least one network interface card located on the computer; b) obtain information in response to the application of the standardized access method; and c) load software appropriate for the network interface card onto the computer in response to the first information.

In still another aspect, the present invention provides a computer readable storage medium for use with computer apparatus, the medium including computer instructions which, when executed by the computer apparatus: a) apply at least one standardized access method to identify the network interface card; b) obtain information in response to the application of the standardized access method; c) apply at least one direct hardware access method to said computer to identify at least one network interface card located on the computer; d) obtain second information in response to the application of the direct hardware access method; and e) load software appropriate for the network interface card onto the computer in response to the second information.

Other features and benefits of the present invention will be apparent from the detailed description of the invention when considered with the accompanying drawings.

BRIEF DESCRIPTION OF THE DRAWINGS

The present invention will be described with respect to particular embodiments thereof, and reference will be made to the drawings in which.

DETAILED DESCRIPTION

Figure 1:
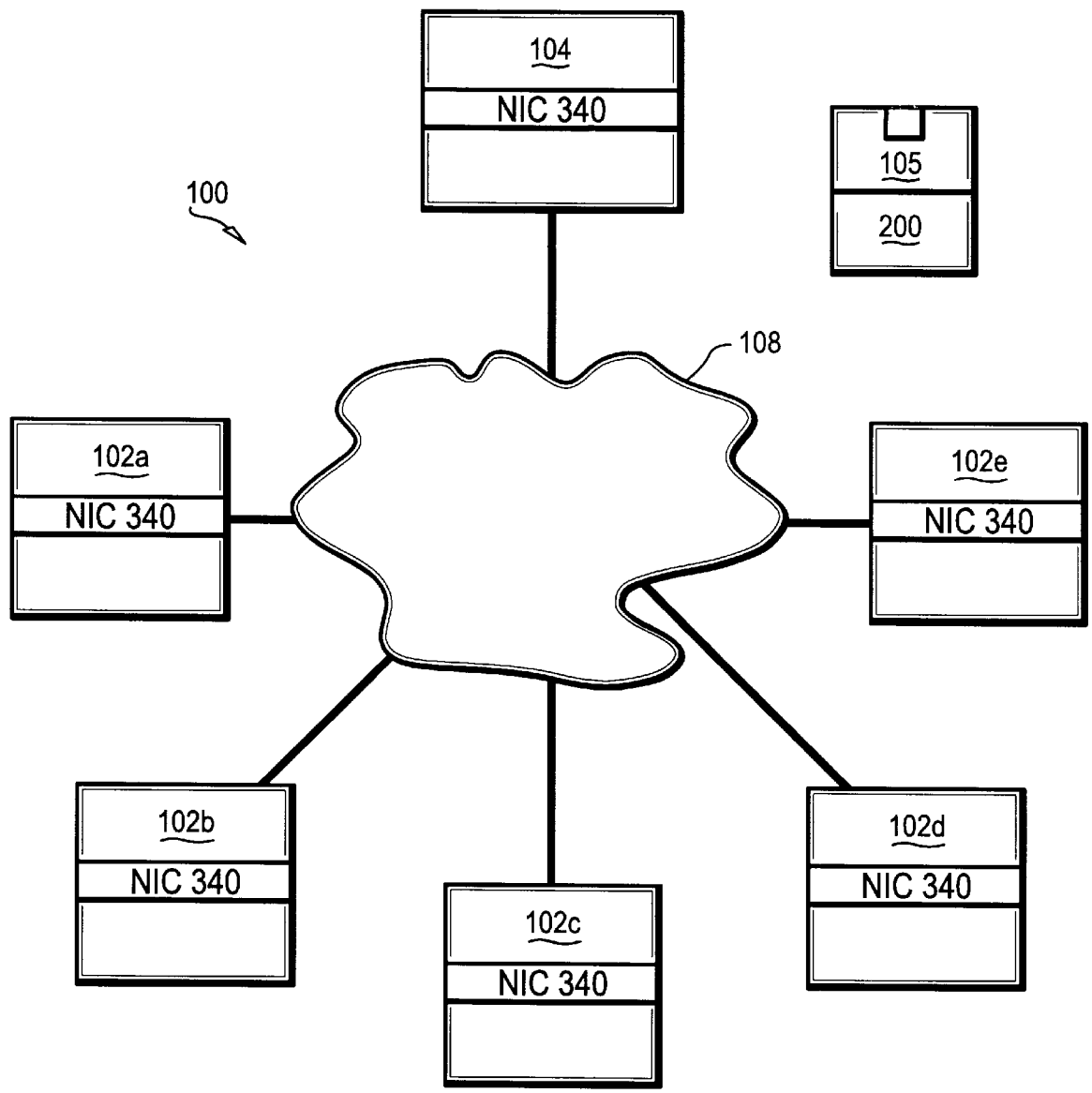
FIG. 1 illustrates a computer network that may be automatically configured by the present invention.

Directing attention to FIG. 1, a distributed computer network 100 connecting a plurality of networked client processing devices, such as computers 102a–102e and a server computer 104. In a preferred embodiment, the client computers 102 are generally desktop computers such as PC's or workstations, but may include other specialized computers for various applications as well, such as printers, palmtop computers, scanners or the like. The client computers 102 and server computer 104 each contain a NIC, which allows them to communicate with each other via a network connection 108 such as ethernet token ring, or any other suitable topology or mechanism to link computers in a network. Client computer 102 and server computer 104 are illustrated in greater detail with reference to computer system 300 in FIG. 3, explained below. The NIC contained in each computer may be of a different manufacturer or different models by the same manufacturer, thus different device drivers must be maintained on the computer to operate the NIC. In a large computer network, each computer may be uniquely identified by its configuration of hardware and software. When a computer is added to the distributed computer system 100, the unique configuration may not be readily ascertainable without disassembly and inspection of the hardware, and line-by-line examination of the device drivers stored in memory.

For this reason, in one preferred embodiment, a portable medium 105 may be utilized to implement the present invention. A boot floppy or other commonly used medium may be used upon start up to control the computer 102. In an alternative preferred embodiment, the present invention may be implemented on a server computer 104 connected to the client computers 102. While the auto detection and configuration process of an embodiment of the present invention is easy to use when implemented on a portable medium, incorporating the auto detection and configuration process in the server computer 104 in another embodiment of the invention allows the customization of operating systems and application software immediately subsequent to executing the automatic detection and identification process. Further, implementing the present invention on a server computer 104 allows the detection and configuration process to be performed at times when the network has low traffic or is not being used, so as to minimize wasted resources in the event that any configuration process hangs or large scale software upgrades need to be performed. The method described below is described with reference to commonly known DOS-based files, but modifications may be made to allow the present invention to be used with other operating systems.

Figure 2A:
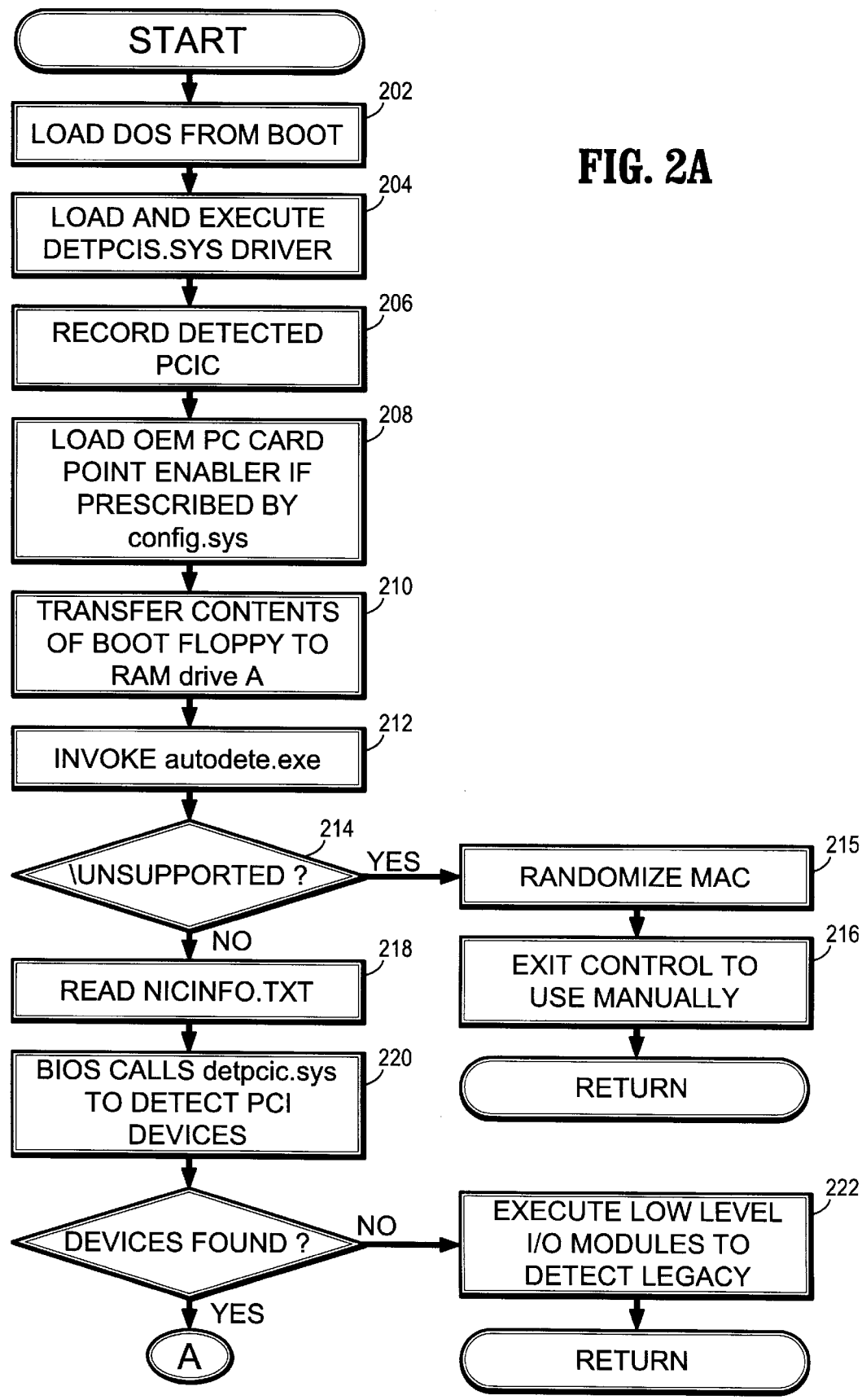
FIGS. 2A and 2B are flow diagrams showing operative steps of the method of one embodiment of the present invention.
Figure 2B:
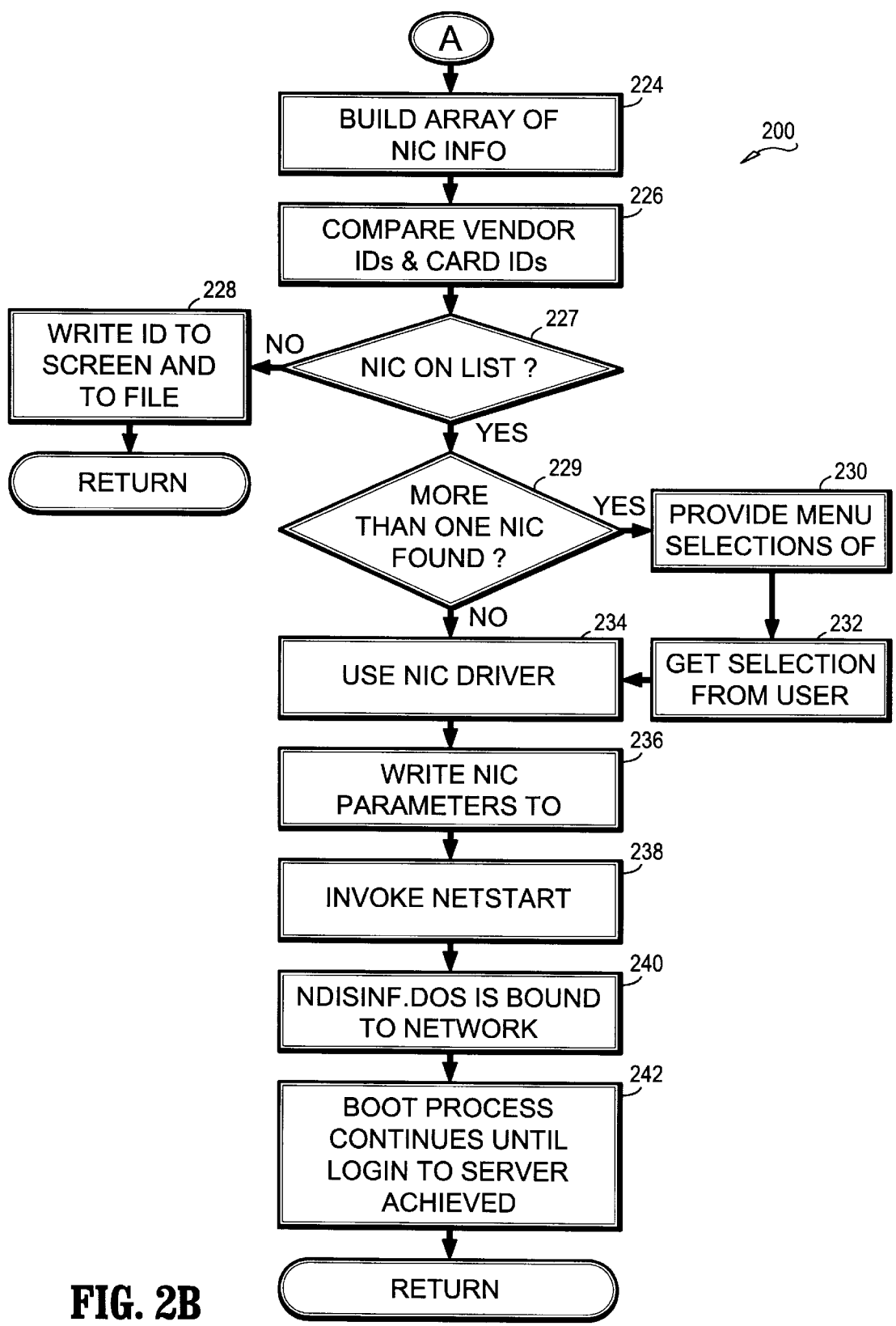

FIGS. 2A and 2B illustrate the logical sequence of steps that perform the automatic detection and identification of installed NICs, executed by preferred embodiments of the present invention. For more information about NIC configuration and standardized access methods, see The Network Interface Technical Guide by Douglas T. Anderson, incorporated herein by reference in its entirety.

Beginning at step 202, the client computer 102 loads DOS either from the boot floppy 105 or the server computer 104 via the network connection 108. Continuing to 204, the client computer 102 loads and executes DETPCIC.SYS driver. DETPCIC.SYS is a standardized access algorithm known to those skilled in the art and used to detect PCIC bus NICs. The detected PCIC information is recorded in memory 325 of the client computer 102. Continuing to step 208, the client computer 102 loads OEM PC card point enabler if prescribed by config.sys. This depends on the configuration of the client computer 102. At step 210, the remaining contents of the boot floppy 105 are transferred to RAM drive A (memory 325). This step is optional if the server embodiment is utilized. At step 212, the client computer 102 invokes AUTODETE.EXE. Autodetection may be invoked in the autoexec.bat file of most DOS based systems. If AUTODETE.EXE is invoked with the "/unsupported" parameter (step 214), control continues to step 215 where the Media Access Controller (MAC) is randomized. Steps 214 and 215 are optional steps that maybe used to escape out of the autodetection process in instances where manual mechanisms require editing the NIC configuration is to be used for a NIC that cannot be made to work any other way. Control then continues to step 216 where the client computer 102 exits control to use manually adjusted files to finish the configuration process, and no automatic detection of the installed NIC is possible.

However, if autodetection is supported, control continues to step 218 where the client computer 102's file, NICINFO.TXT, a file known to those skilled in the art to contain network interface card information, is read. Control then continues to step 220 where the BIOS calls DETPCIC-.SYS to detect peripheral component interface ("PCI") devices. If PCI devices are not found (step 221), control continues to step 222 where the client computer 102 executes well known direct hardware access methods such as low level I/O modules to detect integrated systems architecture plug and play ("ISA PnP") network controllers. Tests are also performed here to detect the presence of devices that use PCIC compatible controllers, and finally for ISA legacy boards. However, if PCI devices are found, control continues to step 224 (FIG. 2B) where the client computer 102 builds an array of NIC information. Control then proceeds to step 226 where the vendor IDs and the card IDs are compared, using the array of NIC information and a list of possible NICs. If the NIC detected is not referenced by the list (step 227), control continues to step 228 where the identifier of the detected NIC is displayed and written to a file and control returns. However, if the NIC detected is on the list, if more than one NIC has been found (step 229), control continues to 230 where the client computer 102 provides a menu selection of NICs. The client computer 102 then obtains a selection of possible NICs at step 232 and control continues to step 234 where the driver corresponding to the selected NIC is verified and used. Alternatively, if only a single NIC is found, that NIC driver is used. Continuing to step 236, the NIC parameters are written to files. At step 238, NETSTART, a routine which performs startup operations for the network 100, is executed. Control continues to step 240 where the address for NDISFNF.DOS is bound to the network stacks in memory 325. Control then proceeds to step 242 where the boot process continues until log in to the server computer 104 is achieved.

If the above described sequence of steps is performed by the server computer 104, the server computer 104 may immediately download operating system or application software using the appropriate files for the detected NIC.

Figure 3:
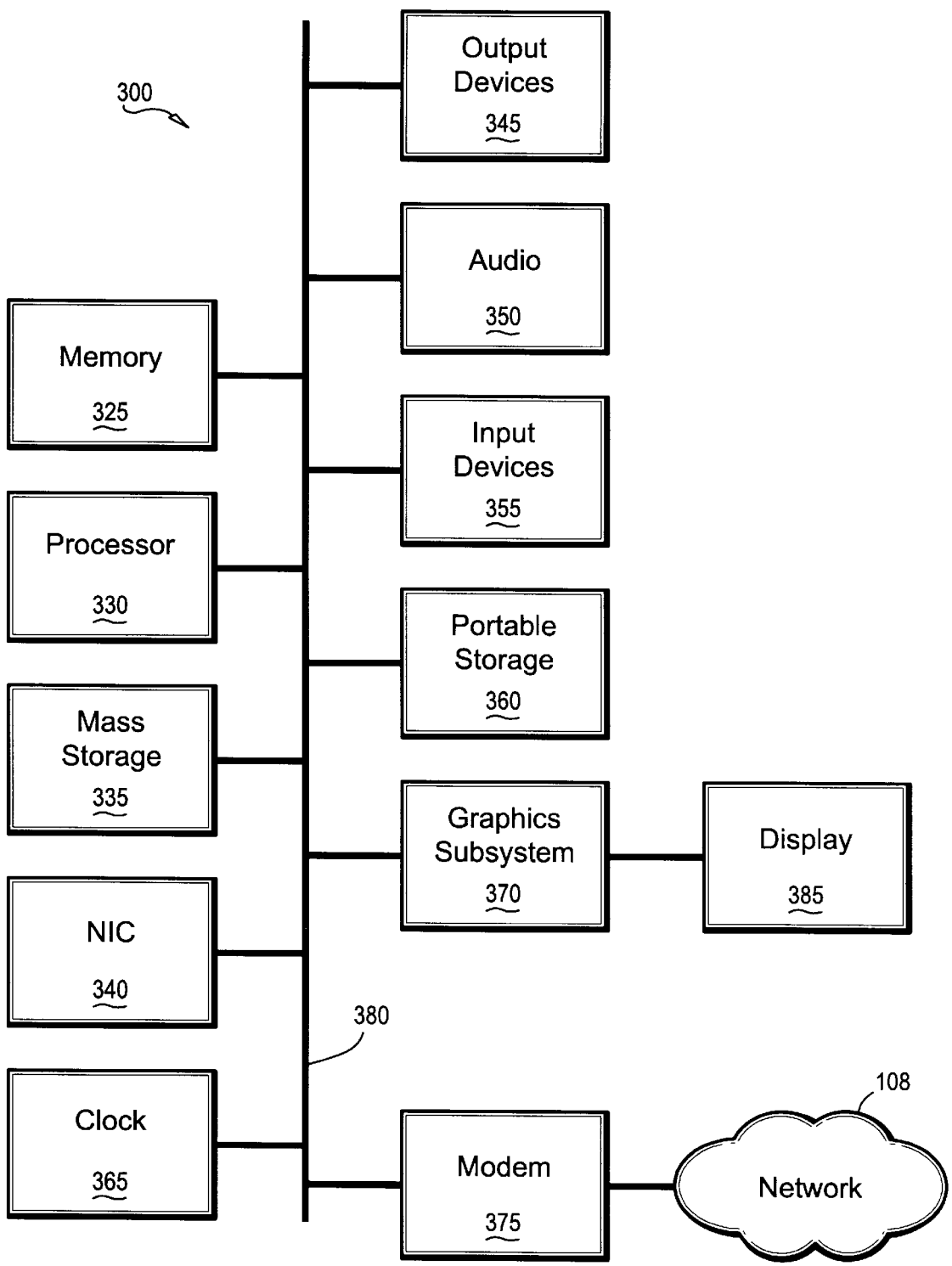
FIG. 3 is a high level block diagram illustrating the major components of a computer system utilized by an embodiment of the present invention.

FIG. 3 is high-level block diagram view of an embodiment of a computer system having a computer program that causes the computer system to perform the method of the present invention. The computer system 300 includes a processor 330 and memory 325. Processor 330 may contain a single microprocessor, or may contain a plurality of microprocessors for configuring the computer system as a multi-processor system. Memory 325, stores, in part, instructions and data for execution by processor 330. If the system of the present invention is wholly or partially implemented in software, including a computer program 310, memory 325 stores the executable code when in operation. Memory 325 may include banks of dynamic random access memory (DRAM) as well as high speed cache memory. The system 300 further includes a mass storage device 335, network interface card(s) 340, input device(s) 355, portable storage medium drive(s) 360, a graphics subsystem 370 and a display 385. For simplicity, the components shown in FIG. 3 are depicted as being connected via a single bus 380. However, the components may be connected through one or more data transport means. For example, processor 330 and memory 325 may be connected via a local microprocessor bus, and the mass storage device 335, network interface card(s) 340, portable storage medium drive(s) 360, and graphics subsystem 370 may be connected via one or more input/output (I/O) buses. Mass storage device 335, which is typically implemented with a magnetic disk drive or an optical disk drive, is a non-volatile storage device for storing data and instructions for use by processor 330. The method of the present invention also may be stored in processor 330.

Portable storage medium drive 360 operates in conjunction with a portable non-volatile storage medium, such as a floppy disk, or other computer-readable medium, to input and output data and code to and from the computer system 300. Input device(s) 355 provide a portion of a user interface. Input device(s) 355 may include an alpha-numeric keypad for inputting alpha-numeric and other key information, or a pointing device, such as a mouse, a trackball, stylus or cursor direction keys. In order to display textual and graphical information, the computer system 300 includes graphics subsystem 370 and display 385. Display 385 may include a cathode ray tube (CRT) display, liquid crystal display (LCD), other suitable display devices, or means for displaying, that enables a user to interact with the computer program. Graphics subsystem 370 receives textual and graphical information and processes the information for output to display 385. Additionally, the system 300 may include output devices 345. Examples of suitable output devices include speakers, printers, and the like. The devices contained in the computer system 300 are those typically found in general purpose computer systems, and are intended to represent a broad category of such computer components that are well known in the art.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of this invention.

What is claimed is:

1. A method of automatically configuring a computer having at least one network interface card, comprising the steps of:

applying at least one standardized access method to said computer to identify at least one network interface card;

obtaining information in response to said application of said standardized access method;

randomizing a Media Access Controller (MAC) address of said network interface card if said computer does not support automatic detection of said network interface card; and loading software appropriate for said network interface card onto said computer in response to said information if said computer does support automatic detection of said network interface card.

2. The method of claim 1, further comprising the step of:

allowing user selection of said network interface card prior to said loading step if multiple network interface cards are identified by said applying step.

3. The method of claim 1, further comprising the step of:

verifying that said software is suitable for said computer and said network interface card.

4. A method of automatically configuring a computer having at least one network interface card, comprising the steps of:

applying at least one standardized access method to said computer to identify at least one network interface card;

obtaining first information in response to said application of said standardized access method;

randomizing a Media Access Controller (MAC) address of said network interface card if said computer does not support automatic detection of said network interface card;

applying at least one direct hardware access method to identify said network interface card if said first information fails to identify said network interface card and said computer supports automatic detection of said network interface card;

obtaining second information in response to said application of said direct hardware access method; and loading software appropriate for said network interface card onto said computer in response to said second information.

5. The method of claim 4, further comprising the step of:

allowing user selection of said network card prior to said loading step if multiple network interface cards are identified by said applying step.

6. The method of claim 4, further comprising the step of: verifying that said software is suitable for said computer and said network interface card.

7. The method of claim 4, wherein said standardized access method detects PCIC network interface cards.

8. The method of claim 4, wherein said direct hardware access method detects ISA network interface cards.

9. A server computer system for configuring a client computer having at least one network interface card, said server computer system comprising:

a first interface for receiving requests to configure said client computer;

a memory;

a processor coupled to said memory and said first interface;

a second interface, connecting said server computer system to said client computer, for communicating network interface card configuration information between said client computer and said server computer; and instructions to be executed by said processor, said instructions capable of instructing said server computer to perform the steps of:

applying at least one standardized access method to said client computer to identify at least one network interface card;

obtaining information in response to said application of said standardized access method;

randomizing a Media Access Controller (MAC) address of said network interface card if said client computer does not support automatic detection of said network interface card; and loading software appropriate for said network interface card onto said client computer in response to said information if said client computer does support automatic detection of said network interface card.

10. A computer readable storage medium for use with computer apparatus, said medium including computer instructions which, when executed by said computer apparatus:

apply at least one standardized access method to identify at least one network interface card;

obtain information in response to said application of said standardized access method;

randomize a Media Access Controller (MAC) address of said network interface card if said computer does not support automatic detection of said network interface card; and load software appropriate for said network interface card onto said computer in response to said information if said computer does support automatic detection of said network interface card.

11. A computer readable storage medium for use with computer apparatus, said medium including computer instructions which, when executed by said computer apparatus:

apply at least one standardized access method to identify at least one network interface card;

obtain first information in response to said application of said standardized access method;

randomize a Media Access Controller (MAC) address of said network interface card if said computer does not support automatic detection of said network interface card;

apply at least one direct access method to identify at least one network interface card if said first information fails to identify said network identification card and said computer does support automatic detection of said network interface card;

obtain second information in response to said application of said direct hardware access method; and load software appropriate for said network interface card onto said computer in response to said second information.

* * * * *